United States Patent
Temkine et al.

(10) Patent No.: US 9,347,836 B2
(45) Date of Patent: May 24, 2016

(54) DYNAMIC VOLTAGE REFERENCE FOR SAMPLING DELTA BASED TEMPERATURE SENSOR

(75) Inventors: Grigori Temkine, Ontario (CA); Filipp Chekmazov, Ontario (CA); Paul Edelshteyn, Ontario (CA); Oleg Drapkin, Ontario (CA); Kristina Au, Ontario (CA)

(73) Assignee: ATI Technologies ULC, Markham (CA)

( * ) Notice: Subject to any disclaimer, the term of this patent is extended or adjusted under 35 U.S.C. 154(b) by 609 days.

(21) Appl. No.: 13/296,804

(22) Filed: Nov. 15, 2011

(65) Prior Publication Data

US 2013/0120930 A1    May 16, 2013

(51) Int. Cl.
  *G01K 7/01*    (2006.01)
  *G06F 1/20*    (2006.01)

(52) U.S. Cl.
  CPC . *G01K 7/01* (2013.01); *G06F 1/206* (2013.01)

(58) Field of Classification Search
  CPC .............. G01K 7/01; G01K 3/08; G01K 3/14
  USPC ......... 374/170–173, 178, 183, 185, 4, 5, 141, 374/1; 702/130, 99; 327/512, 513
  See application file for complete search history.

(56) References Cited

U.S. PATENT DOCUMENTS

| | | | |
|---|---|---|---|
| 5,094,546 A * | 3/1992 | Tsuji | 374/178 |
| 5,490,059 A | 2/1996 | Mahalingaiah et al. | |
| 5,619,430 A * | 4/1997 | Nolan et al. | 702/63 |
| 5,774,704 A | 6/1998 | Williams | |
| 5,795,069 A * | 8/1998 | Mattes et al. | 374/183 |
| 5,829,879 A * | 11/1998 | Sanchez et al. | 374/178 |
| 5,929,344 A * | 7/1999 | Hays et al. | 73/861.357 |
| 6,008,685 A * | 12/1999 | Kunst | 327/512 |
| 6,149,299 A * | 11/2000 | Aslan et al. | 374/178 |
| 6,280,081 B1 * | 8/2001 | Blau et al. | 374/1 |
| 6,332,710 B1 * | 12/2001 | Aslan et al. | 374/183 |
| 6,437,614 B1 * | 8/2002 | Chen | 327/143 |
| 6,554,469 B1 * | 4/2003 | Thomson et al. | 374/178 |
| 6,612,737 B1 * | 9/2003 | Lobban | 374/183 |
| 6,816,351 B1 * | 11/2004 | Frank et al. | 361/103 |
| 6,870,357 B1 * | 3/2005 | Falik | 324/71.5 |

(Continued)

FOREIGN PATENT DOCUMENTS

EP    1736851 A2    12/2006
WO    2006/037119 A2    4/2006

*Primary Examiner* — Gail Kaplan Verbitsky
(74) *Attorney, Agent, or Firm* — Rory D. Rankin; Meyertons, Hood, Kivlin, Kowert & Goetzel, P.C.

(57) ABSTRACT

A system and method for measuring integrated circuit (IC) temperature. An integrated circuit (IC) includes a thermal sensor and data processing circuitry. The thermal sensor utilizes switched currents provided to a reference diode and a thermal diode. The ratios of the currents provided to each of these diodes may be chosen to provide a given delta value between the resulting sampled diode voltages. At a later time, a different ratio of currents may be provided to each of these diodes to provide a second given delta value between the resulting sampled diode voltages. A differential amplifier within the data processing circuitry may receive the analog sampled voltages and determine the delta values. Other components within the data processing circuitry may at least digitize and store one or both of the delta values. A difference between the digitized delta values may calculated and used to determine an IC temperature digitized code.

18 Claims, 6 Drawing Sheets

(56) References Cited

U.S. PATENT DOCUMENTS

| | | | | |
|---|---|---|---|---|
| 6,933,769 B2* | 8/2005 | Koelling | | 327/538 |
| 6,934,645 B2* | 8/2005 | Kim | | 702/64 |
| 6,957,910 B1* | 10/2005 | Wan et al. | | 374/183 |
| 7,116,588 B2* | 10/2006 | Joo | | 365/189.09 |
| 7,225,099 B1* | 5/2007 | O'Dwyer | | 702/130 |
| 7,243,243 B2 | 7/2007 | Gedeon | | |
| 7,528,644 B2* | 5/2009 | Choi et al. | | 327/512 |
| 7,549,795 B2* | 6/2009 | Kosta et al. | | 374/170 |
| 7,579,898 B2* | 8/2009 | Soldera et al. | | 327/512 |
| 7,648,270 B2* | 1/2010 | Faour et al. | | 374/178 |
| 7,816,967 B1* | 10/2010 | Nagarajan et al. | | 327/291 |
| 7,822,996 B2 | 10/2010 | Watts, Jr. | | |
| 7,828,479 B1* | 11/2010 | Aslan et al. | | 374/178 |
| 7,841,770 B2* | 11/2010 | Lee et al. | | 374/178 |
| 7,956,670 B2* | 6/2011 | Kang | | 327/512 |
| 8,044,702 B2* | 10/2011 | Niederberger | | 327/513 |
| 8,262,286 B2* | 9/2012 | Peterson et al. | | 374/170 |
| 8,471,625 B1* | 6/2013 | Zhou et al. | | 327/539 |
| 8,496,378 B2* | 7/2013 | Mukherjee | | 374/170 |
| 8,723,594 B2* | 5/2014 | Sakaguchi | | 327/538 |
| 8,783,949 B2* | 7/2014 | Griffin et al. | | 374/178 |
| 2003/0110012 A1 | 6/2003 | Orenstien et al. | | |
| 2004/0062292 A1* | 4/2004 | Pennock | | 374/170 |
| 2005/0074051 A1* | 4/2005 | Won et al. | | 374/170 |
| 2005/0259718 A1* | 11/2005 | Phan et al. | | 374/178 |
| 2006/0004538 A1 | 1/2006 | Cancel | | |
| 2006/0153277 A1* | 7/2006 | Yoshida | | 374/178 |
| 2006/0248356 A1 | 11/2006 | Won et al. | | |
| 2006/0253715 A1 | 11/2006 | Ghiasi et al. | | |
| 2007/0061603 A1 | 3/2007 | Cox et al. | | |
| 2007/0098042 A1* | 5/2007 | Choi et al. | | 374/170 |
| 2007/0124609 A1 | 5/2007 | Lee | | |
| 2007/0146047 A1* | 6/2007 | Senriuchi et al. | | 327/512 |
| 2007/0156370 A1 | 7/2007 | White et al. | | |
| 2007/0217559 A1 | 9/2007 | Stott et al. | | |
| 2008/0005592 A1 | 1/2008 | Allarey et al. | | |
| 2008/0022140 A1 | 1/2008 | Yamada et al. | | |
| 2009/0046761 A1* | 2/2009 | Pan | | 374/178 |
| 2009/0110027 A1* | 4/2009 | Chellappa | | 374/178 |
| 2009/0235108 A1 | 9/2009 | Gold et al. | | |
| 2010/0013543 A1 | 1/2010 | Kang | | |
| 2011/0158286 A1* | 6/2011 | Peterson | | 374/170 |
| 2011/0279168 A1* | 11/2011 | Lee et al. | | 327/512 |
| 2012/0087398 A1* | 4/2012 | Himayat et al. | | 375/219 |
| 2013/0215931 A1* | 8/2013 | Vaiana et al. | | 374/178 |

\* cited by examiner

Ratios Table 300

| Second Thermal to First Thermal Current Densities Ratio $N = (J2/J1)$ 310 | Reference Size to Thermal Size Ratio $M = (Aref/Athermal)$ 320 | First Reference to First Thermal Current Densities Ratio $P = (Jref/J1)$, $P^2 = N$ 330 | Second Reference to Second Thermal Current Densities Ratio $Q = (Jref/J2)$, $Q = 1/P$ 340 | First Reference to First Thermal Currents Ratio $R = (Iref/I1)$, $R = M \times P$ 350 | Second Reference to Second Thermal Currents Ratio $S = (Iref/I2)$, $S = M \times Q$ 360 |
|---|---|---|---|---|---|
| 4 | 1 | 2 | 1/2 | 2 | 1/2 |
| 4 | 1/2 | 2 | 1/2 | 1 | 1/4 |
| 4 | 1/4 | 2 | 1/2 | 1/2 | 1/8 |
| 16 | 1 | 4 | 1/4 | 4 | 1/4 |
| 16 | 1/2 | 4 | 1/4 | 2 | 1/8 |
| 16 | 1/4 | 4 | 1/4 | 1 | 1/16 |

DYNAMIC VOLTAGE REFERENCE FOR SAMPLING DELTA BASED TEMPERATURE SENSOR

BACKGROUND OF THE INVENTION

1. Field of the Invention

This invention relates to electronic circuits, and more particularly, to measuring integrated circuit (IC) temperature.

2. Description of the Relevant Art

Various processes monitor the temperature of devices for effective control.

These processes may use the substrate temperature of an integrated circuit (IC) for measurement. Manufacturing, automotive and transportation in general, laptops, smart phones, and mobile devices in general, and other fields utilize these processes. Temperature sensors allow ICs to operate under safe thermal conditions to both conserve battery power and prevent damage to on-die transistors.

Examples of temperature sensors include resistance temperature detectors, thermistors, thermocouples, and IC temperature sensors. In contrast to the other types of sensors, the IC temperature sensors do not utilize linearization or cold junction compensation. In addition, the IC temperature sensors generally provide increased noise immunity through higher-level output signals, and some IC temperature sensors provide logic outputs that can interface directly to digital systems.

The IC temperature sensors typically use the property that the difference in forward voltage of a silicon p-n junction is directly proportional to temperature. The base-emitter voltage, $V_{BE}$, of a bipolar junction transistor (BJT) is one example of a forward voltage of a silicon p-n junction. The temperature measurement of an IC may be performed by measuring the $V_{BE}$ of a BJT at two different current densities at a given location of interest. When a ratio of current densities is set to a given constant value, the measured difference between the two voltage values is proportional to the absolute temperature of the BJT diode. The difference between the two voltage values may be referred to as the delta $V_{BE}$, or $\Delta V_{BE}$. With accurate knowledge of the values of the two current densities, a calculated temperature value from the measured $\Delta V_{BE}$ may be independent of an initial forward voltage, physical size of the junction, leakage, and, to a first order, other junction characteristics, such as a variable non-ideality factor.

A concurrent method for measuring the $\Delta V_{BE}$ value utilizes two separate BJT devices and concurrently samples a $V_{BE}$ value for each of the two BJTs. The two separate BJTs may be referred to as thermal BJTs. The concurrent method may generally introduce and suffer from process mismatches between the two separate thermal BJTs, which may in turn affect the overall accuracy of the IC temperature sensor.

A sequential method for measuring the $\Delta V_{BE}$ value utilizes a single thermal BJT. A first $V_{BE}$ value is sampled at a first current density followed by sampling a second $V_{BE}$ value at a second current density. An erroneous temperature measurement may occur when an IC's temperature rises sharply in a short time span near a sampling period for the two $V_{BE}$ values. This sharp rise in temperature may occur when a core clock in the IC jumps in frequency, such as when a performance-power state is changed. Alternatively, a sharp rise may occur when one or more portions of the IC transition from a standby state to an enabled state. The error in the temperature measurement may be significant. This error this can lead to a range of unintended consequences, including, but not limited to erratic IC fan spinning, system shutdown, or IC overheating.

In view of the above, efficient methods and systems for measuring IC temperature are desired.

SUMMARY OF EMBODIMENTS OF THE INVENTION

Systems and methods for efficiently measuring IC temperature are contemplated.

In one embodiment, an integrated circuit (IC) includes a thermal sensor and data processing circuitry. The thermal sensor utilizes switched currents provided to a reference diode and a thermal diode. The ratios of the currents provided to each of these diodes may be chosen to provide a given delta value between the resulting sampled diode voltages. At a later time, a different ratio of currents may be provided to each of these diodes to provide a second given delta value between the resulting sampled diode voltages. A differential amplifier within the data processing circuitry may receive the analog sampled voltages and determine the delta values. Other components within the data processing circuitry may at least digitize and store one or both of the delta values. A difference between the digitized delta values may be calculated and used to determine an IC temperature digitized code.

These and other embodiments will be further appreciated upon reference to the following description and drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 1:
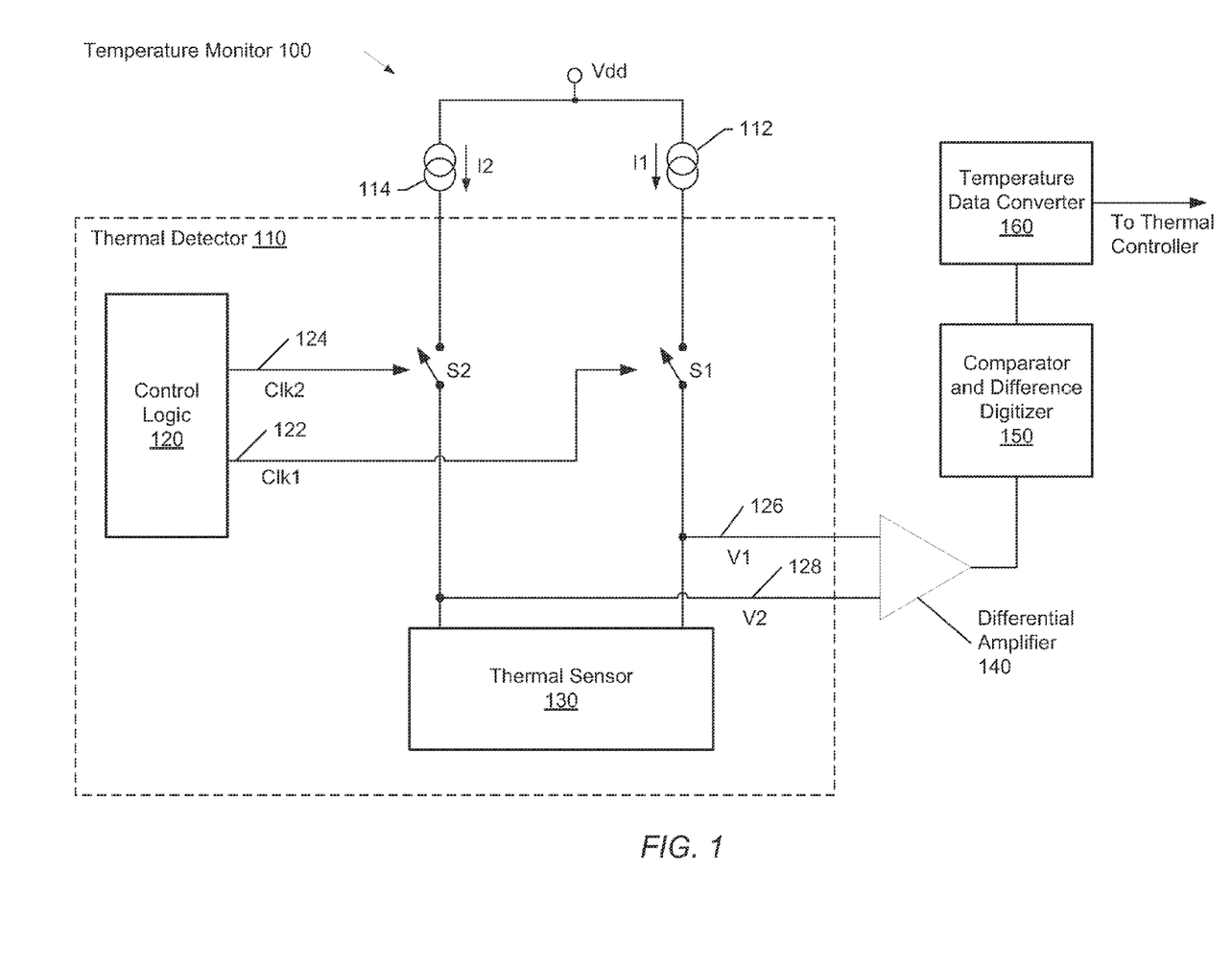
FIG. 1 is a generalized block diagram of one embodiment of a temperature monitor.

Referring to FIG. 1, one embodiment of a temperature monitor 100 is shown. As shown, the temperature monitor 100 may include a thermal detector 110 that provides one or more sampled voltages that may be proportional to absolute temperature. The temperature detector 110 may measure the substrate temperature of a given location within an integrated circuit. The integrated circuit may be a processor core, an application specific integrated circuit (ASIC), a memory, and so forth. The temperature detector 110 may be used in a cooling system for the integrated circuit, such as a performance-power operational mode/state selector, a fan controller, and so forth.

In various embodiments, the thermal detector 110 may include a thermal sensor 130 that receives switched currents. The thermal sensor 130 may provide sampled voltage levels V1 and V2 on lines 126 and 128 based on the switched currents and the substrate temperature. The thermal sensor 130 may provide an accurate substrate temperature measurement without being affected by the process mismatches discussed above. In addition, the thermal sensor 130 may provide an accurate substrate temperature measurement despite abrupt on-die temperature ramps from events such as clock frequency jumps, particular blocks changing from a standby state to an enabled state, and the like.

In addition to thermal sensor 130, a variety of additional components may be utilized in monitor 100. FIG. 1 illustrates such components for exemplary purposes. For example, the thermal detector 110 may receive currents I1 and I2 from the current sources 112 and 114. In addition to the thermal sensor 130, the thermal detector 110 may include switches S1 and S2 and control logic 120. One embodiment of signal processing components that receive and process the sampled voltages V1 and V2 on lines 126 and 128 may include a differential amplifier 140, a comparator and difference digitizer 150, and a temperature data converter 160. Other combinations of components used to build a temperature monitor 100 that utilize the thermal sensor 130 are possible and are contemplated.

The temperature detector 110 may send the sampled voltages to a differential circuit 140. The differential circuit 140 may be a differential amplifier. A comparator and difference digitizer 150 receives the output of the differential circuit 140 and provides digital information to a temperature data converter 160. The temperature converter 160 may send a digital code output that represents a temperature value. This output may be sent to a temperature controller, such as a fan controller, an operational mode selector, or other.

Each of the components 140-160 may have an associated gain. The differential amplifier 140 may amplify, or magnify, the voltage difference between V1 on line 126 and V2 on line 128. In various embodiments, one or more filters may be used to prevent the voltage inputs V1 and V2 on lines 126 and 128 to be significantly influenced by noise. The analog output voltage from the differential amplifier 140 may be sent to the comparator and digital digitizer 150.

The digital digitizer within component 150 may include an analog-to-digital converter (ADC). The ADC may provide a digital value for the measured voltage difference between V1 and V2. This digital value may be stored. The stored digital value may be compared to an earlier measurement. Alternatively, the stored digital value may be compared to a later measurement. Digital noise filtering may be used on one or more of the inputs and outputs of the ADC. A result of the comparison may be sent to the temperature data converter 160, which translates the result to a temperature digital code. In one embodiment, the components 140 and 160 are located on-die near the thermal detector 110. In other embodiments, one or more of the components 140-160 are located off-die and external pin connections or leads are used to transfer signals.

The thermal detector 110 includes a thermal sensor 130 that senses substrate temperature with the use of switched currents. In one embodiment, the switched currents may be provided by the current sources 112 and 114. In various other embodiments, the switched currents may be provided by other components. The switches S1 and S2 may be used to gate the switched currents. In one embodiment, the switches S1 and S2 are complementary metal oxide semiconductor (CMOS) transmission gates formed by an NFET and a PFET connected in parallel. Other implementations for the switches are possible and contemplated. The switches S1 and S2 may be controlled by clock signals Clk1 and Clk2 on lines 122 and 124.

In one embodiment, the clock signals Clk1 and Clk2 may be asserted in a manner to cause the switches S1 and S2 to close at a same time. The frequency and duty cycle of each of the clock signals Clk1 and Clk2 may follow a given temperature sampling period. The control logic 120 may determine when to transition the clock signals Clk1 and Clk2. The currents I1 and I2, which are sourced by current sources 112 and 114 in one embodiment, may flow to the thermal sensor 130 when the switches S1 and S2 are closed. In one embodiment, the current I2 is an integer multiple of the current I1. When the currents I1 and I2 flow to the thermal sensor 130, the voltages V1 and V2 may change value based on at least the substrate temperature and the ratio of the currents I1 and I2. The differential amplifier 140 may measure a difference between the voltages V1 and V2.

The thermal sensor 130 may be placed in a location of interest on an integrated circuit (IC). In various embodiments, the thermal sensor 130 may include one or more diodes used to measure substrate temperature. The substrate temperature of a given location on the IC may be measured by sampling the forward voltage of a silicon p-n junction of a given diode at two different current densities. For example, when one or more switches, such as S1 and S2, are closed, one or more diodes may receive the respective currents I1 and I2 and an associated diode voltage may be measured. The voltages V1 and V2 may indicate the diode voltages.

When a BJT is used to implement a diode, the difference between the two sampled base-emitter voltages, may be expressed as $\Delta V_{BE} = V_t \times \mu \times \ln(J_2/J_1)$. Here, "$V_1$" is the thermal voltage, which may be measured in degrees Kelvin. The thermal voltage equals $k \times T/q$, where "k" is Boltzmann's constant $1.381 \times 10^{-23}$ Joules/Kelvin, "T" is the absolute temperature of the diode in degrees Kelvin, and "q" is the electron charge value $1.602 \times 10^{-19}$ coulombs. The BJT ideality factor, "$\mu$", may be assumed to be a constant for both a given process and a range of the BJT base-emitter junction current densities. Values for the ideality factor, "$\mu$", may vary between 1 and 2. The term "$J_2/J_1$" is the ratio of the current densities.

When the ratio of current densities, "$J_2/J_1$", is set to a constant value, the $\Delta V_{BE}$ value may be proportional to the absolute temperature "T". The $\Delta V_{BE}$ value may be referred to as the PTAT Voltage (Proportional To Absolute Temperature). For typical "$J_2/J_1$" ratios, the dependence of the diode to measure the $\Delta_{BE}$ value may be in the range of 100 microvolts ($\mu V$) to 200 $\mu V$ per one degree Kelvin. Therefore, measuring the $\Delta V_{BE}$ value may provide an indication of the BJT base-emitter junction temperature "T".

Two available methods for measuring the $\Delta V_{BE}$ value include a concurrent method and a sequential method. The concurrent method samples the voltages $V_{BE1}$ and $V_{BE2}$ at the same time to establish the $\Delta V_{BE}$ value in real time. Two separate diode-connected BJTs may be used for this measurement. The two separate BJTs may be referred to as thermal BJTs. The concurrent method suffers from occupying appreciable on-die real estate, as the thermal BJTs are not relatively small. In addition, the concurrent method introduces process mismatches between the two separate thermal BJTs, which affect the overall accuracy of the IC temperature sensor. The errors resulting from BJT device mismatches linearly scale with the base-emitter voltage and/or current. Therefore, these errors cannot be compensated by calibration techniques at a single temperature point.

The sequential method utilizes one thermal diode-connected BJT. The voltage value $V_{BE1}$ may be sensed, or sampled, at a first point-in-time when a first current density, $J_1$, is supplied to the BJT. At a second point-in-time after the first point-in-time, the voltage value $V_{BE2}$ may be sensed, or sampled, when a second current density, $J_2$, is supplied to the BJT. The sequential method eliminates process mismatches between different thermal diode-connected BJTs. However, when an IC's temperature rises sharply in a relatively short time span, the sequential method may provide erroneous temperature readings. An abrupt temperature ramp may occur across the entire die of the IC or the ramp may occur within a particular area of the IC. The abrupt temperature ramp may occur when a core clock within the IC jumps to higher frequency, or when particular areas of the IC are enabled from a standby state. During a peak of the temperature ramp event, the rate of change of the temperature may reach 1 degree Kelvin per 1 to 10 milliseconds. The temperature-sampling period may be within this timeframe causing erroneous temperature readings. The error in the temperature reading may range from several degrees Kelvin to as much as 10 to 20 degrees Kelvin.

An erroneous temperature reading may falsely indicate a temperature spike. The spike may be directed either upward or downward depending on the implementation of the temperature recording architecture. The falsely indicated spike may lead to a range of the unintended consequences, such as erratic fan spinning for the IC, system shutdown, overheating of the IC, and so forth.

The erroneous reading may result from the inverse dependence of the base-emitter voltage, $V_{BE}$, of the sensing diode-connected BJT on the absolute temperature. An expression for the base-emitter voltage of the BJT is $V_{BE}=V_t \times \mu \times \ln(I_d/I_s)$. Here, "$I_d$" is the base-emitter junction current of the BJT and "$I_s$" is the reverse bias saturation current of the BJT. The saturation current, $I_s$, has a strong dependence on temperature. Although this dependence is complex, a first order approximation shows $I_s$ increases exponentially with the absolute temperature T. As a result, $V_{BE}$ linearly decreases with the temperature. A typical rate may be 1.6 to 2.0 millivolts (mV) per 1 degree Kelvin. This dependence is a larger temperature dependence than that of the PTAT voltage $\Delta V_{BE}$. During the sequential method, if the voltage $V_{BE2}$ is sampled at a significantly different temperature than $V_{BE1}$, then the calculated difference $\Delta V_{BE}$ value may be skewed and indicate an erroneous temperature reading.

In one example, the ratio of current densities, $J_2/J_1$, may be set to a constant value of 4. During the sequential method, the voltage $V_{BE2}$ may be sampled at an average temperature 1 degree Kelvin higher than the average temperature when the voltage $V_{BE1}$ is sampled. The resulting temperature error may be approximately 15 degrees Kelvin. Quantitatively, the effect of changing the saturation current, $I_s$, due to temperature during the acquisition of the $\Delta V_{BE}$ value may be shown as follows:

$$\Delta V_{BE}=V_{BE2}-V_{BE1}=V_t \times \mu \times \ln(I_{d2}/I_{s2})-V_t \times \mu \times \ln(I_{d1}/I_{s1})$$
$$=V_t \times \mu \times \ln((I_{d2} \times I_{s1})/(I_{d1} \times I_{s2}))=V_t \times \mu \times \ln(I_{d2}/I_{d1})+$$
$$V_t \times \mu \times \ln(I_{s1}/I_{s2})=\Delta V_{BE0}+V_t \times \mu \times \ln(I_{s1}/I_{s2}).$$

Therefore, the acquired $\Delta V_{BE}$ error due to the IC temperature ramp is $V_t \times \mu \times \ln(I_{s1}/I_{s2})$. Methods exist for mitigating the effect of a temperature ramp on the temperature reading, but these methods do not eliminate the effect. These methods include reducing the sampling time by either decreasing the number of $V_{BE}$ samples taken or by increasing the sampling frequency. However, this method may be often counterproductive as it decreases an ability to reduce the unwanted noise and other undesired effects during the sense operation. Another method performs digital averaging at a system level to detect and smooth out the erroneous temperature spikes. However, this method may take a long time depending on the algorithm and the filtering may under-report or may ignore the cases when legitimate IC temperature spikes do occur. Therefore, another method may be used for measuring the $\Delta V_{BE}$ value that additionally is unaffected by IC temperature spikes. Further details are provided below.

Figure 2:
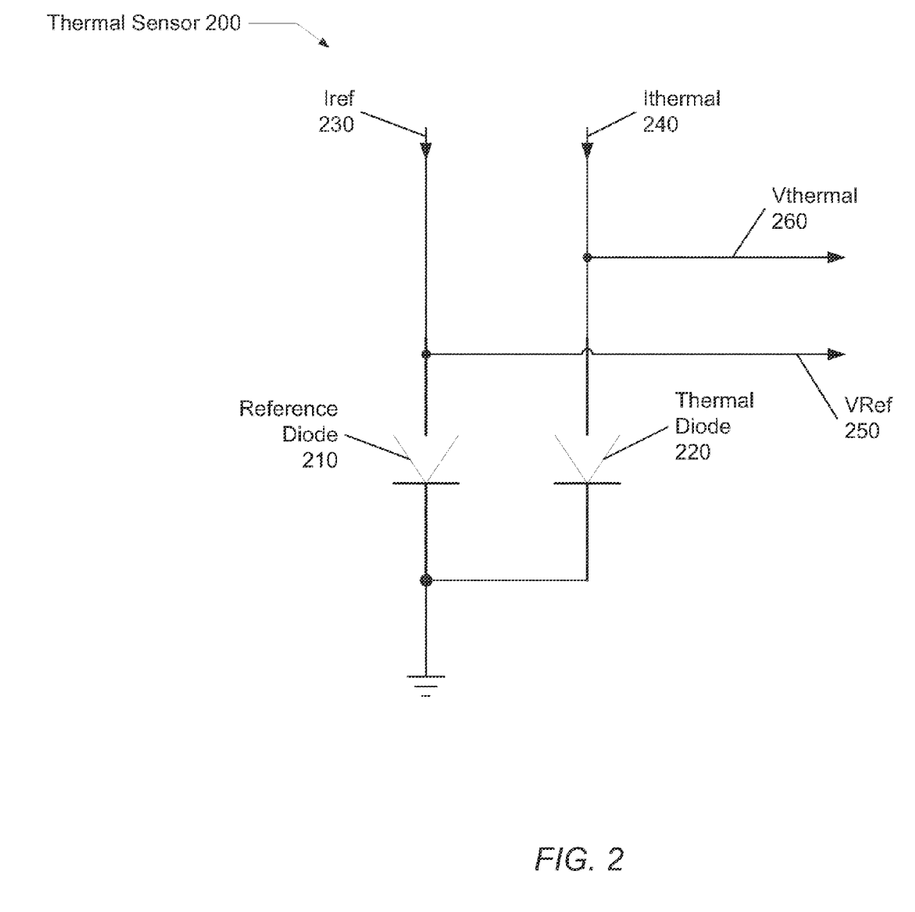
FIG. 2 is a generalized block diagram of one embodiment of a thermal sensor.

Turning now to FIG. 2, a generalized block diagram of one embodiment of a thermal sensor 200 is shown. The thermal sensor 200 may be placed in a location of interest on an integrated circuit (IC). Therefore, the two diodes 210 and 220 may be placed in the location of interest on the IC. In the embodiment shown, each of the two diodes 210 and 220 have a cathode connected to a same voltage reference. In one embodiment, the same voltage reference is a ground reference. The substrate temperature of the location on the IC may be measured by sampling the forward voltage of a silicon p-n junction of a given diode at two different current densities. Each of the two diodes 210 and 220 receives a respective current and an associated diode voltage may be measured. For example, the thermal diode 220 may receive a thermal current, Ithermal 240. A corresponding thermal voltage, Vthermal 260, may be sampled. A thermal current density is a ratio of the thermal current Ithermal 240 to a cross-sectional area of the thermal diode 220. Similarly, a reference diode 210 may receive a reference current, Iref 230. A corresponding reference voltage, Vref 250, may be sampled. A reference current density is a ratio of the reference current Iref 230 to a cross-sectional area of the reference diode 210. In various embodiments, the reference diode 210 may be appreciably smaller than the thermal diode 220. For example, the reference diode 210 may be ¼ or ⅛ the size of the thermal diode 220. Other size ratios are possible and contemplated.

In some embodiments, each of the diodes 210 and 220 may be a circuit utilizing a transistor, such as a parasitic vertical PNP bipolar junction transistor (BJT). In other embodiments, each of the diodes 210 and 220 may be a p-n junction diode, a diode-connected BJT, a diode-connected FET, or any other suitable circuit for providing an indication of substrate temperature. When the forward voltage of a silicon p-n junction of a given diode is sampled at two different current densities, the difference between the sampled voltages may depend on the ratio of the two different current densities as described earlier.

Each of the $V_{BE1}$ and $V_{BE2}$ voltage samples may be measured relative to the reference voltage, Vref 250. The reference voltage, Vref 250, may be sampled with the reference diode 210. The $V_{BE1}$ voltage value may be sampled with the thermal diode 220 at a first-point-time and may be a value of Vthermal 260 at the first point-in-time. The $V_{BE2}$ voltage value may be sampled with the thermal diode 220 at a second point-in-time after the first point-in-time. The $V_{BE2}$ voltage value may be a value of Vthermal 260 at the second point-in-time. For example, at a first point-in-time, the currents Ithermal 240 and Iref 230 may be provided and flow through the diodes 220 and 210, respectively. Each of a $V_{BE1}$ voltage value and a $V_{ref1}$ voltage value may be sampled using the thermal diode 220 and the reference diode 210, respectively.

In one embodiment, at a second point-in-time after the first point-in-time, the current Iref 230 may maintain its value while the current Ithermal 240 may be provided with a different value than its previous value at the first point-in-time. The currents Ithermal 240 and Iref 230 flow through the diodes 220 and 210, respectively. During this second point-in-time, each of a $V_{BE2}$ voltage value and a $V_{ref2}$ voltage value may be sampled using the thermal diode 220 and the reference diode 210, respectively. When Iref 230 maintains its value, any appreciable difference between the sampled voltage values $V_{ref1}$ and $V_{ref2}$ may not be attributed to the current Iref 230 that flows through the reference diode 210. Rather, as one example, any appreciable difference detected between the sampled voltage values $V_{ref1}$ and $V_{ref2}$ may be due to an abrupt on-die temperature ramp.

It is noted that at the second point-in-time, in other cases, the currents Ithermal 240 and Iref 230 may be provided again, although possibly with different values than previous values. The values for the currents 240 and 230 may change from values used during the earlier first point-in-time. However, in such cases, the current Iref 230 may be set in a precise manner at each of the first point-in-time and the second point-in-time. In addition, device mismatches between the diodes 210 and 220 may introduce issues described earlier regarding the concurrent method for measuring substrate temperature. Therefore, maintaining a same value for Iref 230 at each of the first point-in-time and the second point-in-time avoids the device mismatch issue and relaxes the precision of the value for the current Iref 230.

After voltage values are sampled at each of the first point-in-time and the second point-in-time using the diodes 210 and 220, voltage difference calculations may be performed. A calculated $\Delta V_{BE}$ value may be given as follows:

$$\Delta V_{BE} = (V_{BE2} - V_{ref2}) - (V_{BE1} - V_{ref1}) = V_{BE2} - V_{BE1} + V_{ref1} - V_{ref2}$$

Again, by maintaining a same current value Iref 230 at each of the first point-in-time and the second point-in-time, any appreciable difference between the sampled voltage values $V_{ref1}$ and $V_{ref2}$ may not be attributable to changes in the current Iref 230 that flows through the reference diode 210. Rather, in one case, any detected appreciable difference between the sampled voltage values $V_{ref1}$ and $V_{ref2}$ may be due to a substrate temperature difference that occurs during the sampling. A first substrate temperature at the first point-in-time may be different from a second substrate temperature at the later to second point-in-time. In some cases, the substrate temperature difference during sampling is caused by an on-die temperature ramp. In a case when there is no substrate temperature difference during sampling and the current value Iref 230 is maintained during sampling, the sampled voltage values $V_{ref1}$ and $V_{ref2}$ may be approximately the same.

In order to keep each of the differences ($V_{BE2}-V_{ref2}$) and ($V_{BE1}-V_{ref1}$) appreciably small, the reference voltages $V_{ref2}$ and $V_{ref1}$ may be set to a value close to the $V_{BE2}$ and $V_{BE1}$ values. In this manner, each of the differences may be significantly amplified before being sampled by an analog-to-digital converter (ADC). The amplification of the small differences may in turn improve the resolution of the temperature measurement. In one embodiment, a value for the reference voltages $V_{ref2}$ and $V_{ref1}$ may be set to a midpoint between the $V_{BE2}$ and $V_{BE1}$ values. An expression for the reference voltages may be $V_{ref2}=V_{ref1}=(V_{BE2}+V_{BE1})/2$. Again, the reference voltage $V_{ref2}$ may be approximately the same as $V_{ref1}$ when the current value Iref 230 is maintained at a same value when it flows through the reference diode 210 at each of the first point-in-time and the second point-in-time. In addition, the reference voltages $V_{ref2}$ and $V_{ref1}$ may be approximately the same when the substrate temperature does not have an appreciable difference during the sampling.

In one embodiment, the reference voltages $V_{ref2}$ and $V_{ref1}$ are dynamically set and the calculation for the $\Delta V_{BE}$ value may utilize double differential sampling. For example, at a first point-in-time, the difference ($V_{BE1}-V_{ref1}$) may be sampled. At a second point-in-time after the first point-in-time, the difference ($V_{BE2}-V_{ref2}$) may be sampled. During the double differential sampling, the reference voltage adjusts itself based on the temperature in the vicinity of the thermal diode 220. A further description of this adjustment is provided later.

As described earlier, an expression for the difference between the two sampled base-emitter voltages of the thermal diode 220 may be expressed as $\Delta V_{BE}=V_t \times \mu \times \ln(J_2/J_1)$. For a given example when $J_2/J_1=4$, $\Delta V_{BE}=V_t \times \mu \times \ln(4)=V_t \times \mu \times \ln(2^2)=2 \times [V_t \times \mu \times \ln(2)]$. It may be observed from the term in the brackets that setting $J_2$ to be twice the value of $J_1$ causes the resulting BJT voltage $V_{BE}$ to be $(V_{BE2}+V_{BE1})/2$. This value may be an ideal value for a reference voltage. By adding another diode, such as the reference diode 210, adjacent to the thermal diode 220, and supplying a current density that is twice the current density supplied to the thermal diode, or $J_{ref}=2 \times J_1$, the ideal value for the reference voltage Vref 250 may be established. In the case when the reference diode 210 and the thermal diode 220 have a same size, the supplied current Iref 230 is twice the value of the supplied current Ithermal 240. The reference voltage Vref 250 may track itself with the substrate temperature in a same manner as Vthermal 260.

At any given time during the sampling, the reverse bias saturation currents $I_s$ in the diode-connected reference BJT 220 and thermal BJT 210 are equal. These currents are equal because the temperature of both the reference BJT 220 and the thermal BJT 210 are practically identical at a specific instance since these devices are adjacent to one another. As described earlier, the acquired $\Delta V_{BE}$ error due to the IC temperature ramp is $V_t \times \mu \times \ln(J_2/J_1)$. During the condition $J_2=J_1$, the $\Delta V_{BE}$ error is zero. Therefore, both ($V_{BE1}-V_{ref1}$) and ($V_{BE2}-V_{ref2}$) are correct and the temperature calculated by the thermal sensor 200 is the average temperature of the thermal BJT 210 during the sampling period.

In one embodiment, both the Iref current 230 and the Ithermal current 240 are generated using a same master current source. The Iref current 230 may be an integer multiple of the Ithermal current 240. In a case when the size of the reference diode 210 is the same as the size of the thermal diode 220, and $J_{ref}/J_{thermal}=4$, the base-emitter currents have the ratio $I_{dref}/I_{dtherma}=4$ and Iref=2×Ithermal.

In order to save on-die real estate, the size of the reference diode 210 may be scaled down from the size of the thermal diode 220. For example, the size of the diode-connected reference BJT 210 may be ½, ¼, ⅛, or other fraction of the size of the diode-connected thermal BJT 220. In the case when the diode-connected reference BJT 210 is half the size of the diode-connected thermal BJT 220, Iref=Ithermal. This condition is true for each of the first point-in-time and the second point-in-time, or Iref=Ithermal1 and Iref=Ithermal2.

Other ratios for $I_{dref}/I_{dtherma}$, and equivalently $J_{ref}/J_{therma}$, may be chosen than the ratios shown above. For example, by setting $I_{dref}/I_{dtherma}=16$ for equally sized diodes 210 and 220, the sourced currents 230 and 240 generally have the relationship Iref=4×Ithermal. Again, for each of the particular first point-in-time and the second point-in-time, the relationships respectively are Iref=4×Ithermal1 and Iref=4×Ithermal2. By setting $I_{dref}/I_{dtherma}=16$ for a reference diode 210 that is half the size of the thermal diode 220, the sourced currents 230 and 240 generally have the relationship Iref=2×Ithermal. Higher ratios than 16 for $I_{dref}/I_{dtherma}$ are possible and contemplated, but may be cumbersome to implement and experience diminishing benefits due to the logarithmic nature of the BJT Voltage-Current relationship. In addition, higher ratios may introduce noticeable non-ideality effects since the BJT Ideality Factor may not be assumed to be constant for a very wide range of BJT current densities.

Semiconductor processing mismatches between the reference diode 210 and the thermal diode 220 may not affect the accuracy of the thermal sensor 200, since Iref has a same value at each of the first point-in-time and the second point-in-time. Accordingly, the voltage value Vref 250 may not be set precisely. Some offset from an optimal value may be permissible. With careful wire routing, the Vref signal 250 may have a similar noise profile as Vthermal 260 during each of the first point-in-time and the second point-in-time used during sampling. Noise rejection may be improved during the voltage sampling when sampled differentially by utilizing the above-described double-differential sampling.

Figure 3:
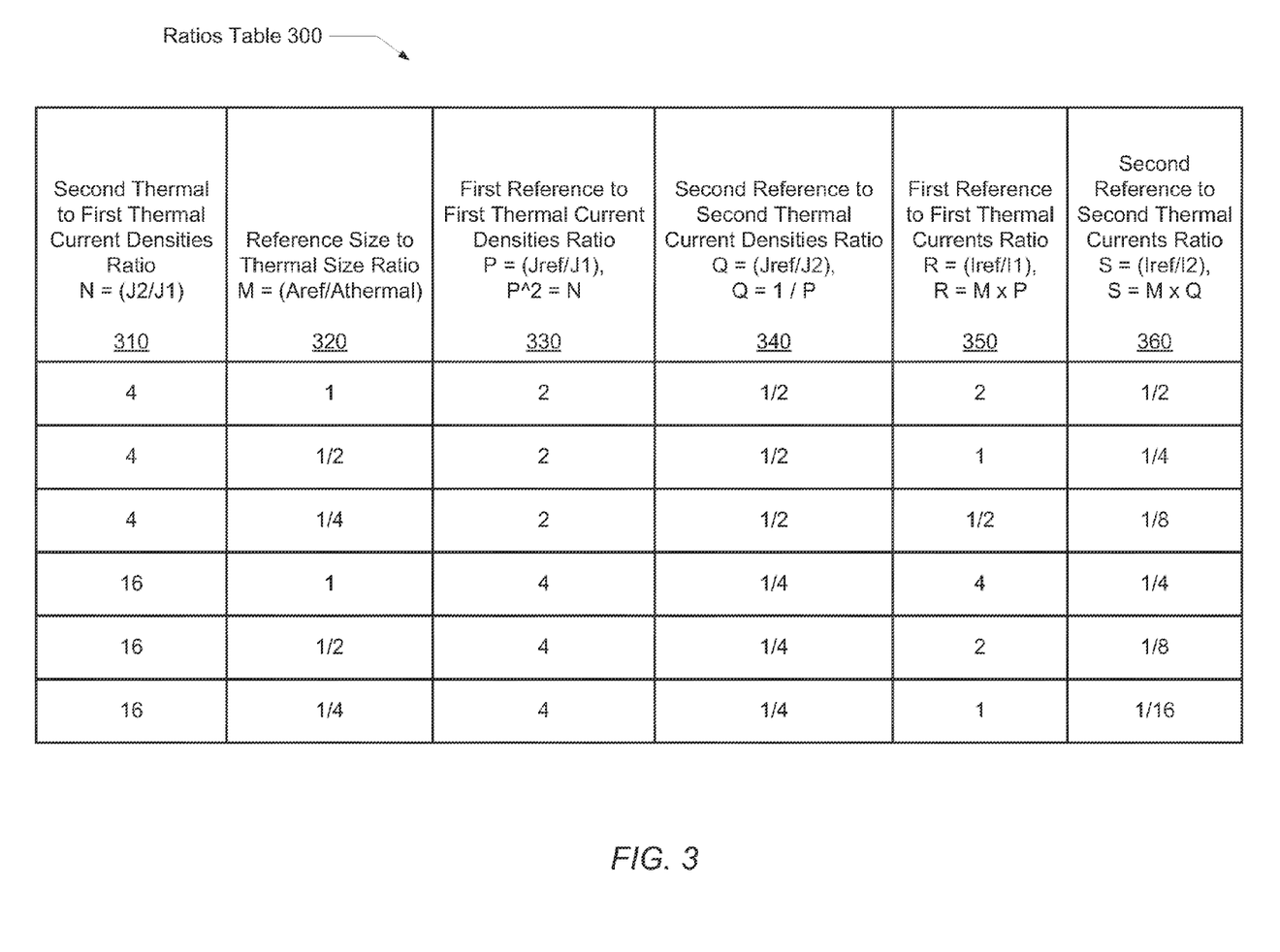
FIG. 3 is a generalized block diagram of one embodiment of a ratios table for current densities used during temperature readings.

Referring now to FIG. 3, one embodiment of a ratios table 30 is shown. As shown above, the $I_{dref}/I_{dthermal}$ ratio, the $J_{ref}/J_{thermal}$ ratio, the reference and thermal diode sizes and the sourced currents Iref 230 and Ithermal 240 may be set to different values with some interdependencies. As shown in table 300, column 310 provides some current density ratios for the diode-connected thermal BJT 220. Here, the "J1" refers to the current density sourced through the thermal BJT 220 at a first point-in-time and "J2" refers to the current density sourced through the thermal BJT 220 at a second point-in-time. This ratio is equivalently the same as the $I_{d2}/I_{d1}$ ratio for the thermal diode 220.

Column 320 in table 300 provides size ratios for the reference BJT 210 and the thermal BJT 220. Here, the "Aref" refers to the cross-sectional area of the reference BJT 210 and the "Athermal" refers to the cross-sectional area of the thermal BJT 220. Column 330 in the table 300 provides current density ratios between the reference BJT 210 and the thermal BJT 220 at a first point-in-time. Here, "Jref" refers to the current density sourced through the reference BJT 210 at the first point-in-time. The ratio shown in column 330 is a square root of the ratio shown in column 310.

The column 340 in the table 300 provides current density ratios between the reference BJT 210 and the thermal BJT 220 at a second point-in-time. Here, "Jref" refers to the current density sourced through the reference BJT 210 at the second point-in-time. As described earlier, the current Iref 230 may maintain its value at each of the first point-in-time and the second point-in-time. Therefore, the current density Jref may maintain its value at each of the first point-in-time and the second point-in-time. The ratio shown in column 340 is an inverse of the ratio shown in column 330. The column 350 in the table 300 provides base-emitter current ratios between the reference BJT 210 and the thermal BJT 220 at a first point-in-time. The ratio shown in column 350 is a product of the ratios shown in columns 320 and 330. The column 360 in the table 300 provides base-emitter current ratios between the reference BJT 210 and the thermal BJT 220 at a second point-in-time. The ratio shown in column 360 is a product of the ratios shown in columns 320 and 340.

Figure 4:
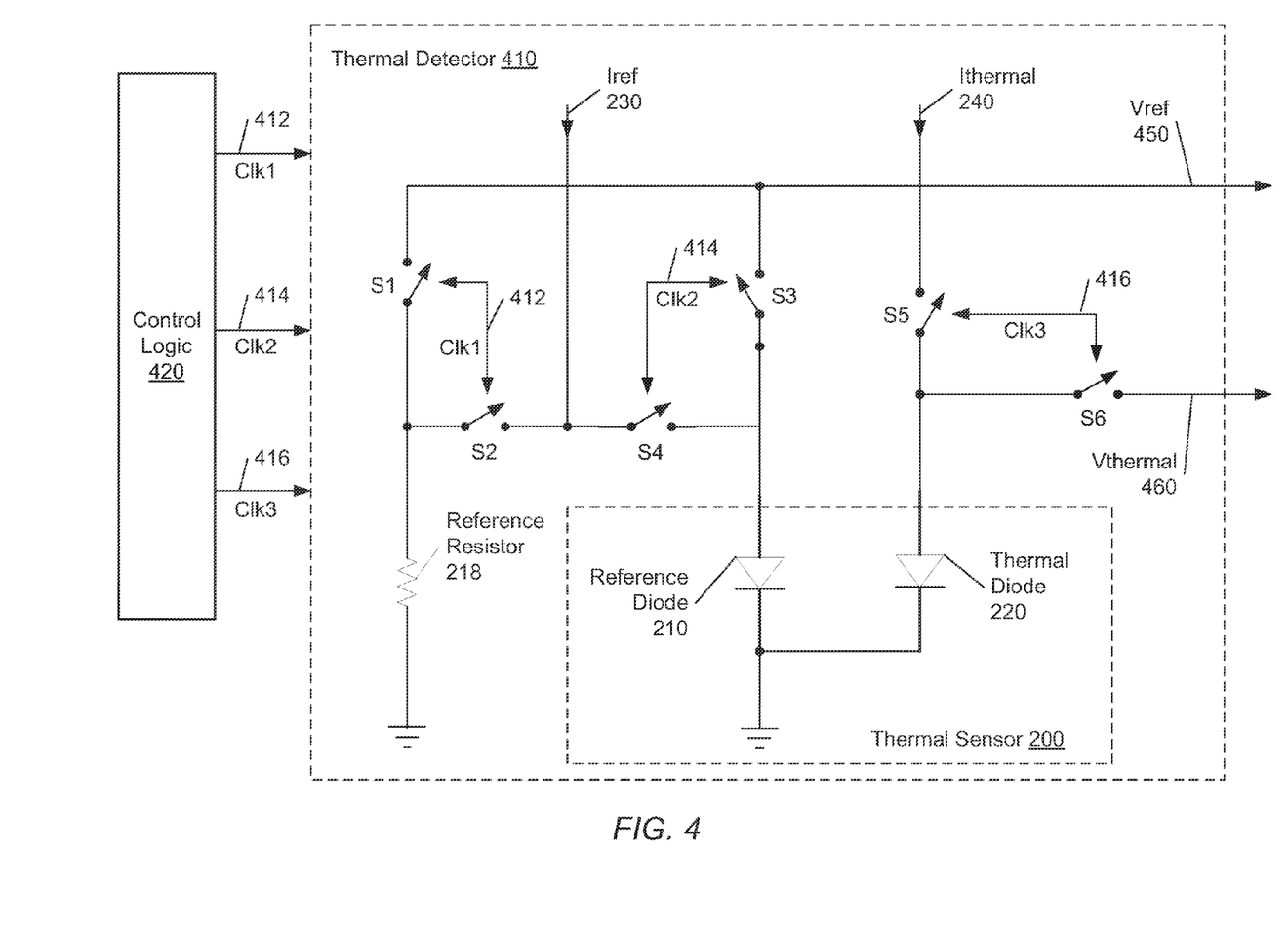
FIG. 4 is a generalized block diagram of one embodiment of a thermal detector.

Turning now to FIG. 4, a generalized block diagram illustrating one embodiment of a thermal measurement system using double differential $\Delta V_{BE}$ sampling is shown. The thermal detector 410 includes the thermal sensor 200 that senses substrate temperature with the use of the reference and thermal diodes 210 and 220 and switched currents. The switched currents Iref 230 and Ithermal 240 may be provided by a master current source, which is not shown for ease of illustration. The switches S3-S6 may be controlled by clock signals Clk2 and Clk3 provided on lines 414 and 416.

In one embodiment, the clock signals Clk2 and Clk3 may be asserted in a manner to cause the switches S3-S6 to open at a same time, later close at a same different time, and repeat. The frequency and duty cycle of each of the clock signals Clk2 and Clk3 may follow a given temperature sampling period. The control logic 420 may determine when to transition the clock signals Clk2 and Clk3 on lines 414 and 416. When the switched currents Iref 230 and Ithermal 240 flow through the diodes 210 and 220, the reference voltage Vref 450 and the thermal voltage Vthermal 460 may be sampled. For example, a differential amplifier may receive these voltages as described earlier regarding the data processing components 140-160.

In one embodiment, the thermal detector 410 utilizes a reference resistor 218 to establish the reference voltage Vref 450 in place of the reference diode 210. The switches S1-S2, rather than the switches S3-S4, may be opened and closed in a synchronous manner with the switches S5-S6. The control logic 420 may determine when to transition the clock signals Clk1 and Clk3 on lines 412 and 416 to perform the synchronization. The reference resistor 218 may be used for comparison purposes between two different methods of temperature acquisition, but not for actual readings for the double differential $\Delta V_{BE}$ sampling since the voltage across the resistor 218 does not track with the voltage of diode 220 due to change in temperature during sampling.

Figure 5:
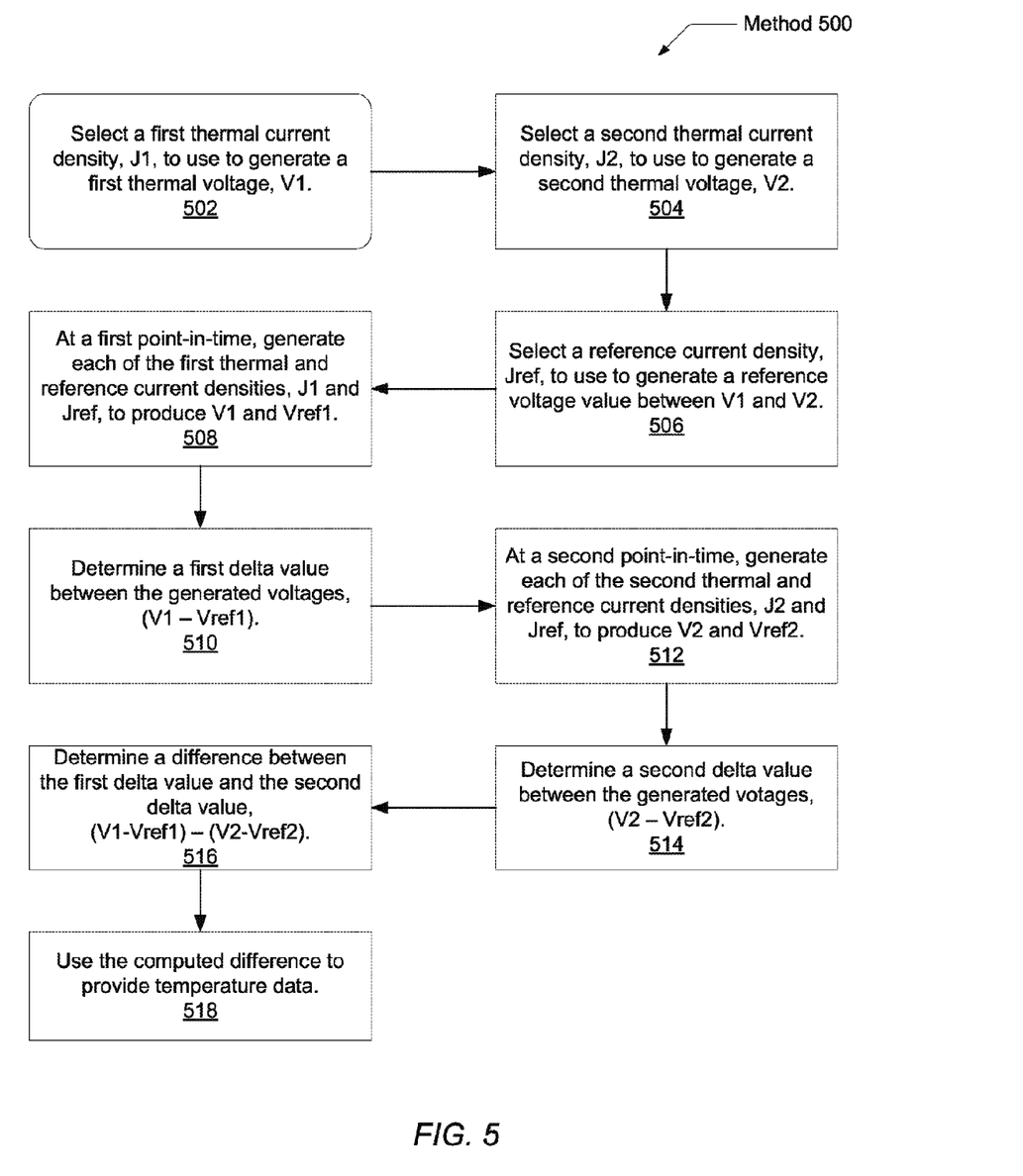
FIG. 5 is a generalized flow diagram of one embodiment of a method for reading on-chip temperature.

Referring now to FIG. 5, a generalized flow diagram of one embodiment of a method 500 for reading on-chip temperature with double differential $\Delta V_{BE}$ sampling is shown. The components embodied in the temperature monitor 100, the thermal sensor 200 and the thermal detector 410 described above may generally operate in accordance with method 500. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 502, a first thermal current density, J1, is selected to generate a first thermal voltage, V1, at a first point-in-time. In block 504, a second thermal current density, J2, is selected to generate a second thermal voltage, V2, at a second point-in-time. In block 506, a reference current density, Jref, is selected to generate a reference voltage value between V1 and V2.

In block 508, at a first point-in-time, each of the first thermal and the reference current densities, J1 and Jref, are sourced and provided to a thermal diode and a reference diode to produce V1 and Vref1. The current densities J1 and Jref may be sourced by providing appropriate currents I1 and Iref to the thermal diode and the reference diode with knowledge of sizes of these diodes. In block 510, a first delta value between the generated voltages, (V1−Vref1), is determined. This difference value may be digitized and stored. In block 512, at a second point-in-time, each of the second thermal and the reference current densities, J2 and Jref, are sourced and provided to a thermal diode and a reference diode to produce V1 and Vref2.

Although a same current value Iref 230 may be used in each of the first point-in-time and the second point-in-time to generate Jref, the voltage value Vref2 sampled at the second point-in-time may be different from the voltage value Vref1 sampled at the first point-in-time due to on-die temperature changes. An on-die temperature change or ramp may be caused by a clock frequency increase due to a change to a different performance-power state. Additionally, a ramp may be caused by particular blocks changing from a standby state to an enabled state. However, each of the voltages V2 and Vref2 sampled at the second point-in-time are affected in a similar manner by the abrupt on-die temperature ramp. The effect of the abrupt on-die temperature ramp may be negated when a difference between the sampled voltages V2 and Vref2 is calculated. Therefore, an accurate substrate temperature may still be measured despite the abrupt on-die temperature ramp. It is noted that in various embodiments, the resulting temperature measurement will approximately reflect an average temperature over the measurement period. In block 514, a second delta value between the generated voltages, (V2-Vref2), is determined. This difference value may be digitized and possibly stored.

Each of the two digitized differences determined above may be compared in block 516. A calculation may be performed to determine a difference between the first delta value and the second delta value, (V1-Vref1)-(V2-Vref2). In block 518, the computed double differential value may be used to provide temperature data, such as a digitized temperature code.

Figure 6:
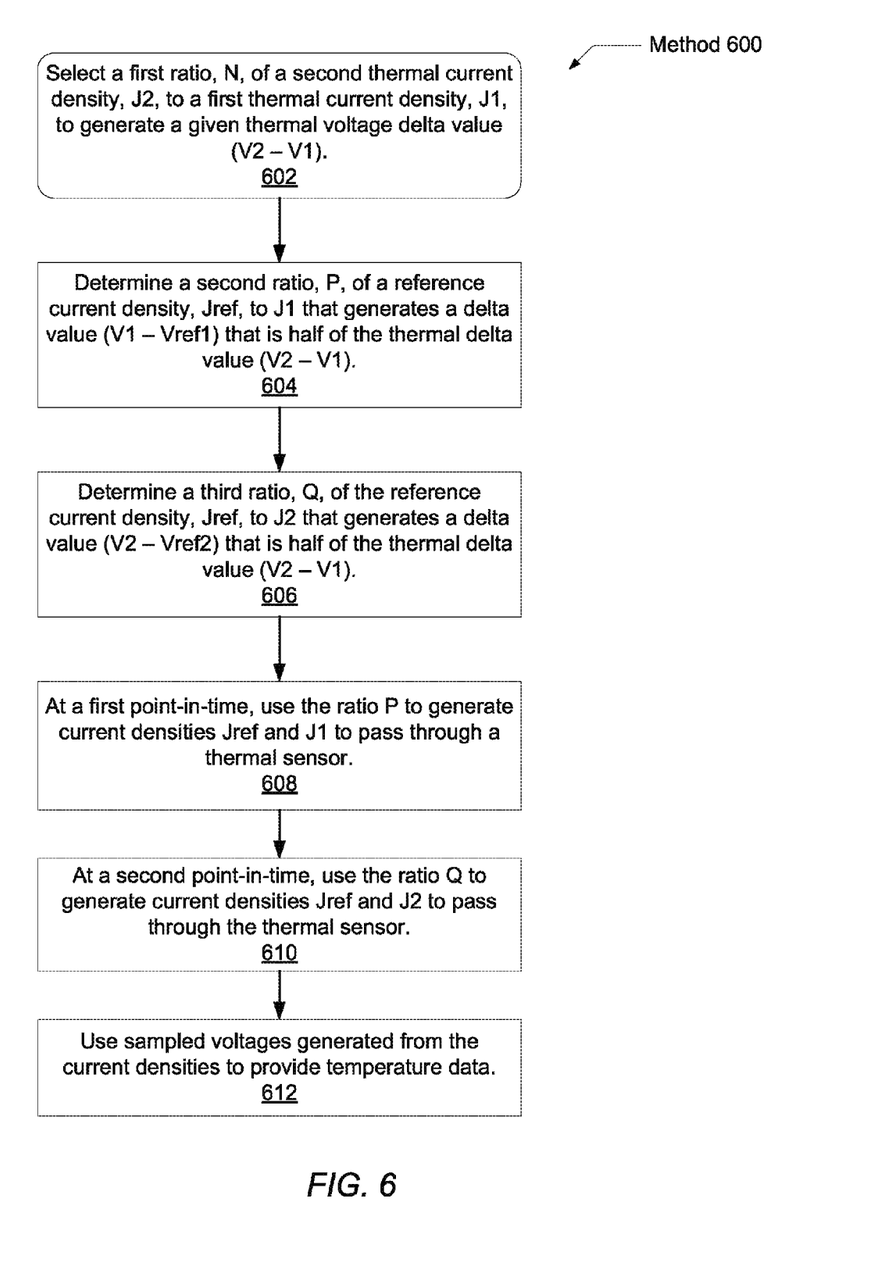
FIG. 6 is a generalized flow diagram of one embodiment of a method for setting up current densities for reading on-chip temperature.

Referring now to FIG. 6, a generalized flow diagram of one embodiment of a method 600 for setting up current densities for reading on-chip temperature is shown. The components embodied in the temperature monitor 100, the thermal sensor 200 and the thermal detector 410 described above may generally operate in accordance with method 600. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 602, a first ratio, N, of a second thermal current density, J2, to a first thermal current density, J1, is selected to generate a given thermal voltage delta value (V2-V1). In block 604, a second ratio, P, of a first reference current density, Jref, to J1 is determined that generates a delta value (V1-Vref1) that is half of the thermal delta value (V2-V1). In block 606, a third ratio, Q, of a second reference current density, Jref, to J2 is determined that generates a delta value (V2-Vref2) that is half of the thermal delta value (V2-V1).

In block 608, at a first point-in-time, the ratio P is used to generate current densities Jref and J1 to pass through a thermal sensor. In block 610, at a second point-in-time, the ratio Q is used to generate current densities Jref and J2 to pass through the thermal sensor. In block 612, the sampled voltages generated from the current densities are used to provide temperature data. For example, a double differential value calculated from the above sampled delta values may be translated into a digitized temperature code.

Referring again to FIG. 3, the ratios shown in table 300 and the ratios used in methods 500 and 600 may utilize the voltage-current relationships and current-temperature relationships for BJT devices. However, the voltage-current relationships and current-temperature relationships for other devices may be used to derive other ratios to provide a double differential sampling used to measure IC temperature.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LP-DDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A temperature measurement circuit comprising:
  circuitry configured to:
    generate a temperature dependent first reference voltage, responsive to a reference current flowing through a reference diode at a first point-in-time;
    generate a temperature dependent second reference voltage, responsive to a reference current flowing through the reference diode at a second point-in-time after the first point-in-time;
    generate a temperature dependent first thermal voltage, responsive to a first thermal current flowing through a thermal diode at the first point-in-time;
    generate a temperature dependent second thermal voltage, responsive to a second thermal current flowing through the thermal diode at the second point-in-time, wherein the second thermal current is different from the first thermal current;
    determine a first difference between the first thermal voltage and the first reference voltage at the first point-in-time using a differential amplifier;

determine a second difference between the second thermal voltage and the second reference voltage at the second point-in-time using the differential amplifier;

determine an indication of a temperature based at least in part on the first difference and the second difference; and output the indication of the temperature.

2. The temperature measurement circuit as recited in claim 1, wherein the circuitry is further configured to:

generate the first thermal voltage and the first reference voltage at a given area of an integrated circuit at the first point-in-time; and generate the second thermal voltage and the second reference voltage at the given area at the second point-in-time, wherein any difference between the first reference voltage and the second reference voltage at the given area is based on a temperature difference that occurs between the first point-in-time and the second point-in-time.

3. The temperature measurement circuit as recited in claim 2, wherein the circuitry is further configured to:

digitize using an analog-to-digital converter within a digital digitizer each of the first difference and the second difference; and determine using a comparator a third difference between the digitized first difference and the digitized second difference.

4. The temperature measurement circuit as recited in claim 3, wherein a reference current density is a ratio of the reference current to a cross-sectional area of the reference diode through which the reference current flows, wherein each of a first and a second thermal current density is a ratio of a respective first or second thermal current to a cross-sectional area of the thermal diode through which the respective first or second thermal current flows at a respective first or second point-in-time, and wherein a first ratio of the reference current density to the first thermal current density provided at the first point-in-time is a square root of a second ratio of the second thermal current density provided at the second point-in-time to the first thermal current density.

5. The temperature measurement circuit as recited in claim 4, wherein a ratio of the reference current density to the second current density provided at the second point-in-time is an inverse of the first ratio.

6. The temperature measurement circuit as recited in claim 4, wherein the reference diode is smaller than the thermal diode.

7. The temperature measurement circuit as recited in claim 3, wherein the circuitry is further configured to:

convert using a temperature data converter the third difference to a temperature digital code; and use the temperature data converter to send the temperature digital code to the thermal cooling controller configured to select a lower performance-power state.

8. A method comprising:

generating a temperature dependent first reference voltage, responsive to a reference current flowing through a reference diode at a first point-in-time;

generating a temperature dependent second reference voltage, responsive to a reference current flowing through the reference diode at a second point-in-time after the first point-in-time;

generating a temperature dependent first thermal voltage, responsive to a first thermal current flowing through a thermal diode at the first point-in-time;

generating a temperature dependent second thermal voltage, responsive to a second thermal current flowing through the thermal diode at the second point-in-time, wherein the second thermal current is different from the first thermal current;

determining a first difference between the first thermal voltage and the first reference voltage at the first point-in-time using a differential amplifier;

determining a second difference between the second thermal voltage and the second reference voltage at the second point-in-time using the differential amplifier;

determining an indication of a temperature based at least in part on the first difference and the second difference; and outputting the indication of the temperature.

9. The method as recited in claim 8, further comprising:

generating the first thermal voltage and the first reference voltage at a given area of an integrated circuit at the first point-in-time; and generating the second thermal voltage and the second reference voltage at the given area at the second point-in-time, wherein any difference between the first reference voltage and the second reference voltage at the given area is based on a temperature difference that occurs between the first point-in-time and the second point-in-time.

10. The method as recited in claim 9, wherein the method further comprises:

digitizing using an analog-to-digital converter within a digital digitizer each of the first difference and the second difference; and determining using a comparator a third difference between the digitized first difference and the digitized second difference.

11. The method as recited in claim 10, wherein a reference current density is a ratio of the reference current to a cross-sectional area of the reference diode through which the reference current flows, wherein each of a first and a second thermal current density is a ratio of a respective first or second thermal current to a cross-sectional area of the thermal diode through which the respective first or second thermal current flows at a respective first or second point-in-time, and wherein a first ratio of the reference current density to the first thermal current density provided at the first point-in-time is a square root of a second ratio of the second thermal current density provided at the second point-in-time to the first thermal current density.

12. The method as recited in claim 11, wherein a ratio of the reference current density to the second current density provided at the second point-in-time is an inverse of the first ratio.

13. The method as recited in claim 10, wherein the reference diode is smaller than the thermal diode.

14. The method as recited in claim 12, further comprising sending the indication of the temperature to the thermal cooling controller configured to perform at least one of the following: select a lower performance-power state and increase a speed of a fan.

15. A computer system comprising:

an integrated circuit (IC) comprising a temperature monitor to:

generate a temperature dependent first reference voltage, responsive to a reference current flowing through a reference diode at a first point-in-time;

generate a temperature dependent second reference voltage, responsive to a reference current flowing through the reference diode at a second point-in-time after the first point-in-time;

generate a temperature dependent first thermal voltage, responsive to a first thermal current flowing through a thermal diode at the first point-in-time;

generate a temperature dependent second thermal voltage, responsive to a second thermal current flowing through the thermal diode at the second point-in-time, wherein the second thermal current is different from the first thermal current; and determine a first difference between the first thermal voltage and the first reference voltage at the first point-in-time using a differential amplifier;

determine a second difference between the second thermal voltage and the second reference voltage at the second point-in-time using the differential amplifier;

determine an indication of a temperature based at least in part on the first difference and the second difference using a temperature data converter; and a thermal cooling controller to:

receive the indication of the temperature from the temperature data converter; and change a condition of operation for the IC in response to determining the temperature exceeds a given threshold.

16. The computer system as recited in claim 15, wherein the temperature monitor comprises circuitry to further:

generate the first thermal voltage and the first reference voltage at a given area of an integrated circuit at the first point-in-time; and generate the second thermal voltage and the second reference voltage at the given area at the second point-in-time, wherein any difference between the first reference voltage and the second reference voltage at the given area is based on a temperature difference that occurs between the first point-in-time and the second point-in-time.

17. The computer system as recited in claim 16, wherein changing the condition of operation by the thermal cooling controller comprises at least one of the following: selecting a lower performance-power state and increasing a speed of a fan.

18. A temperature monitor comprising:

a reference diode to:

generate a temperature dependent first reference voltage responsive to a reference current flowing through the reference diode at a first point-in-time; and generate a temperature dependent second reference voltage responsive to the reference current flowing through the reference diode at a second point-in-time after the first point-in-time;

a thermal diode to:

generate a temperature dependent first voltage, responsive to a first current flowing through a thermal diode at the first point-in-time; and generate a temperature dependent second voltage, responsive to a second current flowing through the thermal diode at the second point-in-time, wherein the second current is different from the first current;

a differential amplifier to:

determine a first difference between the first thermal voltage and the first reference voltage at the first point-in-time; and determine a second difference between the second thermal voltage and the second reference voltage at the second point-in-time; and a temperature data converter to output an indication of a temperature, wherein the indication of the temperature is based at least in part on the first difference and the second difference.

\* \* \* \* \*